United States Patent
Fang et al.

(10) Patent No.: US 10,130,994 B2
(45) Date of Patent: *Nov. 20, 2018

(54) PRODUCTION OF SUBSTANTIALLY SPHERICAL METAL POWDERS

(71) Applicants: Zhigang Z Fang, Salt Lake City, UT (US); Pei Sun, Salt Lake City, UT (US); Yang Xia, Salt Lake City, UT (US); Ying Zhang, Salt Lake City, UT (US)

(72) Inventors: Zhigang Z Fang, Salt Lake City, UT (US); Pei Sun, Salt Lake City, UT (US); Yang Xia, Salt Lake City, UT (US); Ying Zhang, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 111 days.

This patent is subject to a terminal disclaimer.

(21) Appl. No.: 15/234,973

(22) Filed: Aug. 11, 2016

(65) Prior Publication Data

US 2017/0021425 A1    Jan. 26, 2017

Related U.S. Application Data

(63) Continuation of application No. 14/950,346, filed on Nov. 24, 2015, now Pat. No. 9,421,612, which is a
(Continued)

(51) Int. Cl.
*B22F 9/04* (2006.01)
*B22F 1/00* (2006.01)
(Continued)

(52) U.S. Cl.
CPC .............. *B22F 9/04* (2013.01); *B22F 1/0003* (2013.01); *B22F 1/0011* (2013.01);
(Continued)

(58) Field of Classification Search
None
See application file for complete search history.

(56) References Cited

U.S. PATENT DOCUMENTS 3,909,241 A    9/1975  Cheney
3,988,524 A    10/1976 Dreyer
(Continued)

FOREIGN PATENT DOCUMENTS

CN    101913878 A    12/2010
EP    1770176 A1     4/2007
(Continued)

OTHER PUBLICATIONS

Arifvianto et al, "Fabrication of Metallic Biomedical Scaffolds with the Space Holder Method: A Review", Materials, May 6, 2014, pp. 3588-3622, vol. 7, No. 5, ISSN 1996-1944.
(Continued)

*Primary Examiner* — George Wyszomierski
(74) *Attorney, Agent, or Firm* — Thorpe North & Western, LLP

(57) ABSTRACT

A method for producing a substantially spherical metal powder is described. A particulate source metal includes a primary particulate and has an average starting particle size. The particulate source metal is optionally ball milled and mixed with a binder in a solvent to form a slurry. The slurry is granulated to form substantially spherical granules, wherein each granule comprises an agglomeration of particulate source metal in the binder. The granules are debinded at a debinding temperature to remove the binder from the granules forming debinded granules. The debinded granules are at least partially sintered at a sintering temperature such that particles within each granule fuse together
(Continued)

US 10,130,994 B2
Page 2 to form partially or fully sintered solid granules. The granules can then be optionally recovered to form a substantially spherical metal powder.

20 Claims, 8 Drawing Sheets

Related U.S. Application Data continuation of application No. PCT/US2015/030669, filed on May 13, 2015.

(60) Provisional application No. 61/992,692, filed on May 13, 2014, provisional application No. 62/044,781, filed on Sep. 2, 2014, provisional application No. 62/086,524, filed on Dec. 2, 2014.

(51) Int. Cl.
| | |
|---|---|
| B22F 3/10 | (2006.01) |
| B22F 3/04 | (2006.01) |
| B22F 3/16 | (2006.01) |
| B22F 3/24 | (2006.01) |
| B22F 9/02 | (2006.01) |
| C01B 6/02 | (2006.01) |
| B22F 3/105 | (2006.01) |
| B22F 3/15 | (2006.01) |
| B22F 3/22 | (2006.01) |
| B22F 9/00 | (2006.01) |

(52) U.S. Cl.
CPC .......... *B22F 1/0048* (2013.01); *B22F 1/0059* (2013.01); *B22F 1/0096* (2013.01); *B22F 3/04* (2013.01); *B22F 3/1021* (2013.01); *B22F 3/16* (2013.01); *B22F 3/24* (2013.01); *B22F 9/026* (2013.01); *C01B 6/02* (2013.01); *B22F 3/1055* (2013.01); *B22F 3/15* (2013.01); *B22F 3/225* (2013.01); *B22F 2003/244* (2013.01); *B22F 2009/001* (2013.01); *B22F 2009/043* (2013.01); *B22F 2201/11* (2013.01); *B22F 2301/052* (2013.01); *B22F 2301/15* (2013.01); *B22F 2301/20* (2013.01); *B22F 2301/205* (2013.01); *B22F 2301/35* (2013.01); *B22F 2302/45* (2013.01); *B22F 2304/10* (2013.01); *B22F 2304/15* (2013.01); *B22F 2998/10* (2013.01); *B22F 2999/00* (2013.01); *Y02P 10/24* (2015.11); *Y02P 10/295* (2015.11)

(56) References Cited

U.S. PATENT DOCUMENTS

| | | |
|---|---|---|
| 4,478,611 A | 10/1984 | Selden |
| 4,802,915 A | 2/1989 | Kopatz et al. |
| 4,943,322 A | 7/1990 | Kemp, Jr. et al. |
| 5,084,091 A | 1/1992 | Yolton |
| 5,102,452 A | 4/1992 | Taskinen et al. |
| 6,126,712 A | 10/2000 | Hohne et al. |
| 6,171,363 B1 | 1/2001 | Shekhter et al. |
| 6,475,428 B1 | 11/2002 | Fraval et al. |
| 6,508,980 B1 | 1/2003 | Sachs et al. |
| 7,297,271 B2 | 11/2007 | Onishi et al. |
| 7,846,232 B2 | 12/2010 | Pretorius |
| 8,148,281 B2 | 4/2012 | Taniguchi et al. |
| 8,302,661 B2 | 11/2012 | Forbes Jones et al. |
| 9,421,612 B2 * | 8/2016 | Fang ................. C01B 6/02 |
| 2001/0019742 A1 | 9/2001 | Itsukaichi |
| 2003/0110890 A1 | 6/2003 | He et al. |
| 2004/0025632 A1 | 2/2004 | Boily et al. |
| 2005/0137078 A1 | 6/2005 | Anderson et al. |
| 2007/0068341 A1 | 3/2007 | Cheng et al. |
| 2009/0053089 A1 | 2/2009 | Yang et al. |
| 2009/0107294 A1 | 4/2009 | Nishioka et al. |
| 2010/0061925 A1 | 3/2010 | Lee et al. |
| 2010/0064852 A1 | 3/2010 | Zhang |
| 2010/0112350 A1 | 5/2010 | Tanimizu et al. |
| 2011/0039103 A1 | 2/2011 | Calado Da Silva |
| 2011/0103997 A1 | 5/2011 | Kogut et al. |
| 2012/0003488 A1 * | 1/2012 | Kirk ................. C22C 29/06 428/469 |
| 2012/0230860 A1 | 9/2012 | Ward-Close et al. |
| 2012/0272788 A1 | 11/2012 | Withers et al. |
| 2012/0282469 A1 | 11/2012 | Nahas |
| 2013/0000449 A1 | 1/2013 | Van Vuuren et al. |
| 2016/0175929 A1 | 6/2016 | Colin et al. |
| 2017/0297114 A1 * | 10/2017 | Hwang ................. B22F 9/22 |

FOREIGN PATENT DOCUMENTS

| | | |
|---|---|---|
| WO | WO 2012/148471 A1 | 11/2012 |
| WO | WO 2015/001241 A2 | 1/2015 |

OTHER PUBLICATIONS

Supplementary European Search Report dated Nov. 23, 2017, in EP Application No. 15792497, filed May 13, 2015; 3 pages.

* cited by examiner

PRODUCTION OF SUBSTANTIALLY SPHERICAL METAL POWDERS

RELATED APPLICATION(S)

This application is a continuation-in-part application of U.S. application Ser. No. 14/950,346, filed on Nov. 24, 2015, which is a continuation of International Application No. PCT/US15/30669, filed on May 13, 2015, which claims benefit of U.S. Provisional Patent Application No. 61/992,692, filed May 13, 2014, U.S. Provisional Patent Application No. 62/044,781, filed Sep. 2, 2014, and U.S. Provisional Patent Application No. 62/086,524, filed Dec. 2, 2014, which are each incorporated herein by reference.

BACKGROUND

Powder metallurgy is often used to create products composed of pure metals or metal alloys. A powdered metal or multiple powdered metals blended together are compacted into a desired form. The powdered metal is then sintered by heating the powdered metal until the metal particles bond together. Metal powders have recently been used with additive manufacturing techniques, such as 3D printing using laser or electron beam (EB) techniques.

Titanium is one exemplary metal used in powder metallurgy. Titanium possesses exceptional properties including high strength, light weight, superior corrosion resistance, and better biocompatibility than most or all other metals. However, titanium is not currently in wide use except in the aerospace, medical, and defense industries. This is mainly due to the high cost of manufacturing titanium parts. Such manufacturing costs can be more than twenty times that of general purpose steel.

SUMMARY

A method for producing a substantially spherical metal powder is disclosed. The method can include providing a particulate source metal including a primary particulate having an average starting particle size. The method can also include optionally ball milling and mixing the particulate source metal with a binder in a solvent to form a slurry. The slurry can then be granulated to form substantially spherical granules, wherein each granule comprises an agglomeration of particulate source metal in a polymer binder. The method can further include debinding the granules at a debinding temperature to reduce a binder content of the granules forming debinded granules. The debinded granules can be partially sintered or fully sintered at a sintering temperature such that particles within each granule fuse together to form partially or fully sintered granules. Depending on specific powder packing techniques and the sintering temperature, the sintered granules can be discrete particles, or the sintered granules can be connected to each other forming a frangible body of partially or fully sintered granules. Fully sintered is defined as those with greater than 98% theoretical density. The sintered granules can then be recovered to form the substantially spherical metal powder. In some cases separation can involve breaking the frangible body, while in many cases discrete sintered granules can be removed from the furnace.

In another embodiment, a partially sintered frangible body of substantially spherical metal granules can include a plurality of substantially spherical metal granules bonded at contact points between the granules. The fragile body of granules can also retain at least 30% unfused surface area on average. Further, each granule can comprise a plurality of fused metal powder particles.

Yet another embodiment can include a method for producing a substantially spherical metal powder, by providing a partially sintered frangible body of substantially spherical metal granules as described above, and recovering the granules to form the substantially spherical metal powder.

An additional embodiment can include a green body comprising a plurality of substantially spherical granules compacted such that the granules contact each other at contact points while retaining at least 20% void volume between the granules, wherein each granule comprises a plurality of metal powder particles and a polymer binder. The green body can be subjected to a debinding process to remove binder.

An additional embodiment can include a de-oxygenation process applied to the granules. The debinded granules can be mixed with a de-oxygen agent, such as calcium (Ca) or calcium hydride ($CaH_2$). A salt or mixture of salts can also be included in this mixture. The de-oxygen agent can remove oxygen from the granules during sintering or after sintering separately. In one optional aspect, the granules can be separated from each other by a separating agent during sintering. In one example, separation is accomplished by adding CaO, while de-oxygenation is accomplished by adding the de-oxygen agent.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
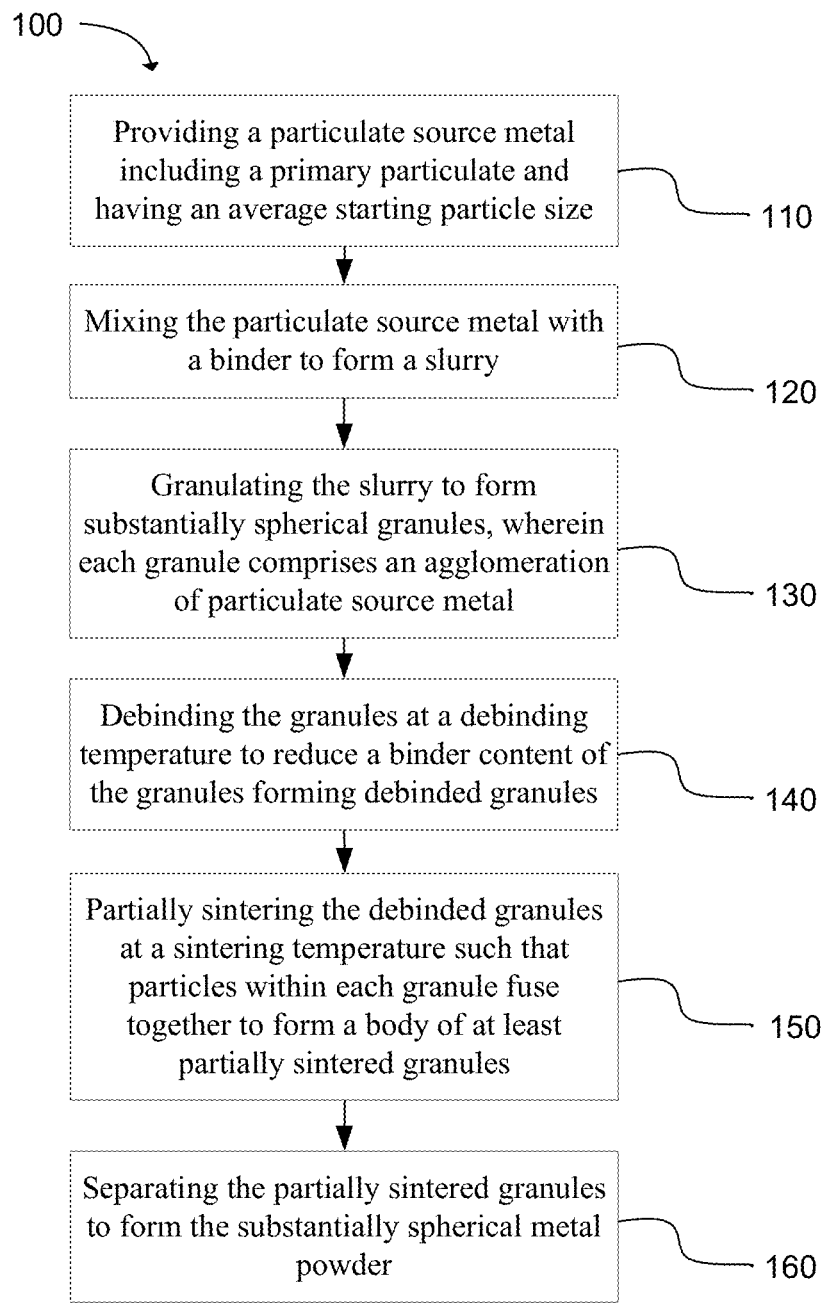
FIG. 1 is a flow chart outlining a method for producing a substantially spherical metal powder in accordance with an embodiment of the present invention.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used. As used herein, "void volume" refers to the volume of spaces between solid granules in a green body, pre-sintered mass or a partially sintered frangible body. A percentage of void volume is therefore the percent of the volume of an entire mass or partially sintered frangible body that is not occupied by solid granules. The void volume can be occupied by, for example, air, vacuum, or other fluids.

As used herein, "granule" refers to an agglomeration of particulate source metal particles. A granule can include the source metal particles in a binder. A debinded granule can include the source metal particles after some or all of the binder has been removed in a debinding step. Within a partially or fully sintered frangible body of metal granules, each granule can include source metal particles that have fused together at a sintering temperature, wherein all the binder has been removed.

As used herein, "sintering" refers generally to a process of heating compacted metal powder to fuse the metal powder particles together. Normally, "sintering" means heating to a sufficient temperature and holding for a sufficient length of time to achieve full or nearly full densification per standard commercial specifications. However, "partial sintering" refers to heating that achieves partial densification, resulting in a partially sintered product that is less dense than a fully sintered product.

Averages may be given with respect to properties of particles or granules in some embodiments of the present invention. Unless otherwise stated, all average values of such properties are number-averages based on the individual particles in the powder, pre-sintered mass, part, or partially sintered frangible body. For example, "average particle size" refers to the number-average particle size, and "average granule size" refers to the number-average size of granules.

The singular forms "a," "an," and "the" include plural referents unless the context clearly dictates otherwise. Thus, for example, reference to "a particle" includes reference to one or more of such materials and reference to "sintering" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Formation of Substantially Spherical Metal Powders

Powder metallurgy can be a low cost alternative to traditional melt-and-wrought metallurgy technologies. However, powder metallurgy also presents challenges. With some source metals, the cost of production of powders to use as source materials can be very high, minimizing the advantages and competitiveness of the powder metallurgy approach. In particular, titanium metal is a good candidate for powder metallurgy, but titanium metal powder can be very expensive to produce.

Typically, titanium metal and titanium alloy powders can be made by one of several different approaches. One of the most common approaches is hydriding and dehydriding method. Titanium hydride powder can be made by hydriding titanium metal. In the industry, titanium hydride is made by hydriding titanium sponge at relatively high temperatures (~700° C.) under a flowing hydrogen ($H_2$) atmosphere. Hydrogenated titanium sponge can be broken into powders of various sizes and then dehydrogenated to produce titanium metal powders, which are usually known as HDH powders. HDH powders normally consist of irregularly shaped particles. HDH powders are also made by hydriding titanium metal alloys scraps including scraped Ti parts or cutting chips from machining Ti alloys.

One commonly-used alloy of titanium is Ti-6Al-4V. Commercially produced Ti-6Al-4V alloy powder is usually made using an atomizing technique. For example, the plasma rotating electrode process (PREP) involves using an electrode to melt the Ti-6Al-4V, followed by rapid solidification of droplets of the molten metal. PREP generally produces high quality powders with uniform alloy composition, spherical shape, and low oxygen. However, PREP powder is extremely expensive, ranging from $150 to $500 per kilogram. Therefore, making components from PREP Ti-6Al-4V powder is not a low cost alternative.

In recent years, a new and emerging manufacturing technology is generating a strong new demand for spherical titanium powders with specific particle size and size distributions. The new manufacturing technology is generally referred to as additive manufacturing or 3D printing. With regard to 3D printing using metal powders, titanium is a popular material for fabricating products. For example, titanium alloys are used to make biomedical implant and prosthetics. 3D printing can be used to create a biomedical implant that is custom designed for a specific patient. Fabrication of complex components for aircraft is another exemplary use of 3D printing with titanium. Advantages of using 3D printing to manufacture components include the cost savings from not needing to fabricate expensive models or molds, the ability to build components with complex geometries that are difficult to fabricate using conventional routes, the ability to customize parts that are optimized for a specific application without a need for large quantities, among other advantages.

However, titanium powders for 3D printing of titanium parts are generally subject to rather strict requirements. Some 3D printing applications require spherically-shaped particles. A specific particle size and narrow size distribution may also be required. Further, oxygen content of the powder can meet requirements of ASTM standards or end users requirements.

Spherical fine titanium powders are also useful for injection molding of titanium parts. Metal powder injection molding (MIM) is a low cost manufacturing technique for making small parts with complex geometry and for large quantities.

The production of spherical titanium powder with a defined particle size can be difficult and expensive. A low cost method for producing spherical titanium powders would therefore be very useful in the industry. This disclosure describes a new method that has potential to reduce the cost of titanium and titanium alloy powders, which can be used for powder metallurgy, such as additive manufacturing, metal powder injection molding, hot isostatic pressing, and surface coating. These spherical powders can be useful in manufacturing titanium components for aerospace, biomedical, chemical, transportation, oil field, consumer sports, electronic, and other industries.

With the above description in mind, FIG. 1 shows a method 100 for producing a substantially spherical metal powder in accordance with an embodiment of the present invention. The method includes providing a particulate source metal including a primary particulate and having an average starting particle size 110. The particulate source metal is mixed and/or ball milled with a polymeric binder to form a slurry 120. The purpose of ball milling is to reduce the size of the source metal particles. The ball milling may be conducted in a liquid comprising water and/or organic solvents. One function of the solvent and the polymeric binder is to protect the powder during milling from being exposed to air and bind the particulate in order to form granules. The slurry is granulated to form substantially spherical granules, wherein each granule comprises an agglomeration of particulate source metal 130. The granules can be debinded at a debinding temperature to remove the binder in the granules, forming debinded granules 140. The debinded granules can be partially or fully sintered at a sintering temperature such that particles within each granule fuse together to form a mass of partially sintered granules 150. Most often the sintering process is controlled so as to allow granules to be sintered while minimizing the bond between granules, to allow the granules to be disconnected from one another to form a loose mass of granules, although in some cases the granules can be bonded to each other at contact points, forming a frangible body of bonded granules. The partially or fully sintered granules can be separated by breaking the frangible body to form the substantially spherical metal powder 160. Debinding and sintering can be conducted separately or in the same furnace as two separate stages.

In some embodiments, the particulate source metal can be titanium hydride powder. The titanium hydride powder can be formed by reacting hydrogen gas with titanium sponge or Ti scrap metals. The hydrided titanium sponge can be crushed into powder by milling or other means. The particulate source metal can also include alloying ingredients. For example, titanium hydride powder can be blended with aluminum and vanadium powders, or an Al—V alloy powder that is known in the industry as "master alloy" powder, in the correct amounts to create Ti-6Al-4V. Other alloying elements for Ti include Fe, Nb, Zr, Mo, and so forth, can be created by blending other alloying ingredients. Regardless, the particulate source metal can often consist of the metal or metal alloy (e.g. allowing for commercially acceptable contents of common impurities).

In other embodiments, the particulate source metal can be an elemental metal. The particulate source metal can be selected from the group consisting of titanium, zirconium, hafnium, thorium, vanadium, niobium, tantalum, chromium, molybdenum, tungsten, nickel, copper, cobalt, and iron. The particulate source material can also be alloys of these metals with each other or with other metals or non-metals. In some cases, the particulate source material can include hydrides of the above metals, oxides of the above metals, or combinations thereof. Non-limiting examples of such metal alloys can include nickel super alloys (e.g. INCONEL 718, INCONEL 600, NIMONIC 75, NIMONIC 90, Alloy 601, Alloy X750, Alloy 718, Alloy X, ATI 718Plus, etc), cobalt-chromium alloys (e.g. CoCr such as F75, F799, F90, and F562), aluminum alloys (e.g. Al—Mn alloys 3xxx, Al—Mg alloys 5xxx, and Al—Zn alloys 7xxx alloys), stainless steel alloys, tantalum alloys (e.g. Ta—W, Ta—Nb, etc), tungsten alloys (W—Cu, W—Ni, W—Fe, HASTELLOY, STELLITE, etc), molybdenum alloys (e.g. TZM, Mo—W, SS 316, superaustenitic steels such as Al-6XN, 254SMO, and 1925hMo, etc), and the like.

In another optional aspect, the particulate source material can be a recovered titanium scrap material. During manufacturing of titanium components, structures and devices using titanium alloys, machining chips of Ti are often generated. Scrap metal can also be generated simply because metal pieces are discarded. Such scrap titanium and other titanium alloys (e.g. Ti-6Al-4V) can be used as the source metal for making the spherical Ti powders according to the present invention. Scrap Ti can be sorted, cleaned, and prepared for processing steps.

In one embodiment, scrap Ti (including alloys) can be hydrogenated in an atmospheric furnace under hydrogen atmosphere. During the hydrogenation process, the materials can be heated to temperatures ranging from 400 to 900° C. The Ti materials are hydrogenated at the heating temperature and during cooling according to their corresponding Ti—H phase diagram or (Ti alloy-H) phase diagrams. Any suitable apparatus and process for hydrogenating Ti can be used.

As an additional example, the particulate source material can be titanium dioxide. When $TiO_2$ is used as the source material for making spherical Ti metal or Ti alloy powders, the $TiO_2$ can be reduced to form $TiH_2$ or Ti metal. Although other reduction processes may be suitable, in one exemplary technique the processes disclosed in the patent application (International Patent Application No. PCT/US14/51621 filed Aug. 19, 2014 which is incorporated herein by reference) can be used. Specifically, the following unit steps can be involved: A $TiO_2$ powder can be obtained. Commercial $TiO_2$ powders include $TiO_2$ pigment, which has a typical size of approximately 0.1 to 0.3 micrometers. Or, $TiO_2$ powder in the size range of 0.5 to 20 micrometers can also be used. $TiO_2$ powder can be reduced using Mg or $MgH_2$ in a hydrogen atmosphere to form $TiH_2$. Leaching of the reduced $TiH_2$ can be used to remove MgO.

As an additional example, the particulate source material can be titanium slag (Ti-slag) or upgraded Ti slag (UGS), or synthetic rutile. Ti-slag typically contains 80 to 85% $TiO_2$, while UGS and synthetic rutile typically contain 90 to 97% $TiO_2$. For convenience, Ti-slag, UGS, and synthetic rutile are all referred to as processed $TiO_2$-rich mineral (PTRM). PTRM can be processed using hydrometallurgical and thermochemical methods to produce pure $TiO_2$ powder with specific particle sizes. The $TiO_2$ powder is substantially impurity free. Although other purification processes may be suitable, one specific suite of techniques may be used. The following unit steps can be involved. First, a PTRM source powder material is obtained. The PTRM source material can be pre-leached by alkali solution with NaOH concentration ranging from 50 to 600 g/L to remove Si in the material. Then the pre-leached material is subjected to a roasting processing. Roasting is conducted by mixing the pre-leached PTRM source material with solid NaOH and charging the mixture in a temperature-controlled static furnace or rotary kiln for 1-4 hours, in order to achieve complete phase transformation to sodium titanate and other sodium metallate. The roasted product is washed in water to remove remaining NaOH, water-soluble sodium metallate, and also release the alkali combined with sodium titanate. Then a mud-like material that is primarily composed of titanic acid ($H_2TiO_3$) is subjected to leaching in dilute HCl solutions to dissolve Ti as well as other transition metal species such as Fe. The leachate is filtrated to remove indissoluble particles to get pure solution.

The leaching is followed by hydrolysis, i.e. the selective precipitation of Ti species in the form of meta-titanic acid ($TiO(OH)_2$), or pyrotannic acid ($H_2Ti_2O_5$), or other similar compound with varying water content. The precipitation process is controlled to yield desired particle size and size distributions. Factors that can affect hydrolysis include temperature, time, free HCl and $TiO_2$ concentrations in initial solution, and stirring rate.

After hydrolysis, the solid particles of meta-titanic acid or pyrotannic acid are rinsed by water and then subjected to calcination at 600° C. to produce anatase $TiO_2$ particles, or at 900° C. to produce rutile $TiO_2$ particles. In some examples, the particle size of $TiO_2$ can range from 0.2 to 100 micrometers. In further examples, the particle size of $TiO_2$ can be controlled at 5 to 20 micrometers. The $TiO_2$ powder can be reduced using Mg or $MgH_2$ as described above.

The starting particle size of the particulate source metal can generally be smaller than the final particle size of the substantially spherical metal powder. In some cases, the average starting particle size can be less than about 10 micrometers. For example, the average starting particle size can be from about 1 micrometer to about 10 micrometers. Alternatively, the average starting particle size can be from about 0.01 micrometers to about 1 micrometer. As the particulate source metal can often have irregularly-shaped particles, the starting particle size can be the length of the longest dimension of the particles.

In some examples, the starting particle size can be greater than 30 micrometers, or greater than +325 mesh. These relatively coarse powders can be reduced in size by milling in order to make spherical granules that are less than 30 micrometer in size. For making spherical granules with sizes greater than 30 micrometers, or greater than 50 micrometers, ball milling may not be necessary. In further examples, the starting particle size can be 1-10 micrometers or less than 5 micrometers, which may be achieved by milling or other techniques for particle size reduction.

In still further examples, the particulate source metal can be ball milled to reduce the particle size and mixed with a binder and a solvent to form a slurry. In some embodiments, mixing the particulate source metal with the binder can comprise wet milling the particulate source metal and the polymeric binder in an organic solvent, water, or mixture thereof. Wet milling can allow for reduction of particle sizes as well as protection of the particle surface from being exposed to air during milling. The binder can be a polymer binder such as paraffin wax, PVA, PEG, PVB, PVP, PMMA, micro-crystalline wax, and other similar polymeric materials, or mixtures thereof. The slurry can also include other ingredients, such as plasticizers, deflocculating agents, surfactants, or mixtures thereof.

The binder can be present in the slurry in an amount that is less by volume than the particulate source metal. In some embodiments, the ratio of binder to particulate source metal in the slurry can be from 1:10 to 1:2. In other embodiments, the ratio of binder to particulate source metal can be from 1:5 to 1:1.

The slurry can be granulated to form substantially spherical granules, wherein each granule comprises an agglomeration of particulate source metal. In some cases, granulating can be performed by spray drying the slurry. Spray drying is a technique used in materials processing, food processing, pharmaceutical and other industries for drying slurries to make granulated powders. The granulation can also be accomplished by other techniques such as, but not limited to, rotary drying techniques, vibratory pelletizing techniques, and freeze drying and other granulation techniques.

The average granule size of the granules after granulation can typically be in the range of about 20% to about 50% larger than the expected average final particle size of the granules depending on how densely the source metal particles are packed within each granule. Although size can vary, granules can often be about 20 micrometers to about 40 micrometers for laser additive manufacturing applications and powder injection molding processes, or 50 to 100 micrometers for additive manufacturing using EB, or greater than 100 micrometers for manufacturing using hot isostatic pressing technology. In some embodiments, the granules can be sorted by size. The granules can then be sieved and classified into different size cuts depending on desired final particle size. The granules can be substantially spherical.

Figure 2:
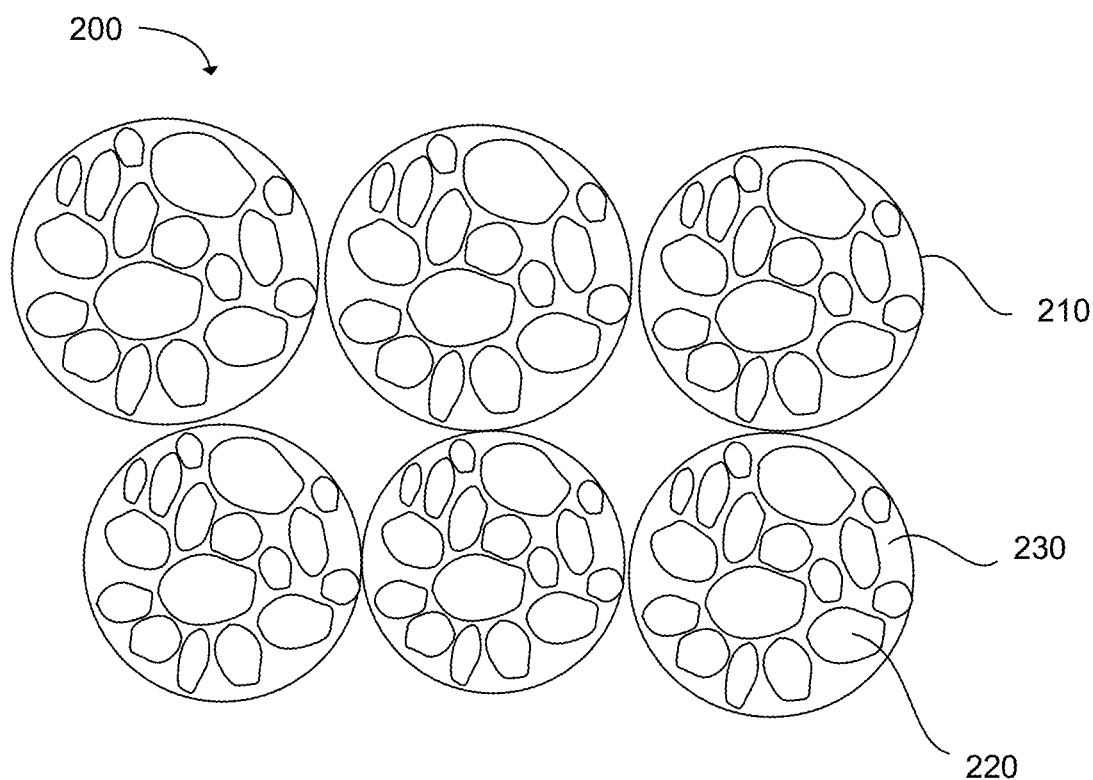
FIG. 2 shows a green body comprising substantially spherical granules of particulate source metal in a binder, in accordance with an embodiment of the present invention.

FIG. 2 shows a green body mass 200 comprising substantially spherical granules 210 of particulate source metal 220 in a binder 230, in accordance with an embodiment of the present invention.

In some cases, the granules can be compacted into a larger agglomerate mass or spread out and distributed across a sheet as a green body mass. The mass can generally be formed as a thin sheet. Although the mass can be any desired shape, typically a thin sheet having a thickness from about one to ten layers of granules (e.g. about 20 μm to about 2 mm) can be used. In one embodiment, the green body can comprise a plurality of substantially spherical granules compacted such that the granules contact each other at contact points while retaining at least 20-40% void volume between the granules, wherein each granule comprises a plurality of metal powder particles and a polymer binder.

In another example, the spray dried granules can be mixed with CaO powder such that granules are separated by CaO powder during sintering. The volume fraction of CaO in the mixture is typically greater than 30%. The mass ratio of granules to CaO can also typically range from 10:1-1:50. The mixture can be die-pressed or cold-isostatic-pressed to eliminate large voids in the granules. The CaO particles can serve as a pressure transmitting media to compact the green (unsintered) granules to a higher relative density, which will benefit the densification of the granules during sintering. Another effect of using CaO to mix with the granules is to keep the granules separated during sintering, thereby minimizing the bonding between the spherical granules and eliminating the need for milling and/or fracturing after sintering.

The granules can be debinded and sintered as the next step. Debinding can be carried out in a number of way including thermal debinding and solvent debinding. Debinding and sintering can be carried out in the same furnace, especially for Ti powders, to avoid exposure of the powder to air after the polymeric binders are removed. However, the debinding and sintering can also be done in two separate steps, which may have advantages in some cases. When the thermal debinding method is used, debinding temperature is typically from 50 to 400° C. Some or all of the binder can be removed during the debinding step. Therefore, debinding can be performed by holding the granules at a debinding temperature for an amount of time sufficient to remove the desired amount of binder. In some cases, the debinding temperature can be from about 50° C. to about 400° C. In some embodiments, the debinding temperature can be from about 150° C. to about 350° C. The debinding time can also vary depending on the particular binder. In some cases, the debinding time can be from about 1 hour to about 100 hours. The debinding can also proceed until a predetermined amount of binder is removed. For example, debinding can proceed until at least 90% of the binder has been removed, and in most cases substantially all of the binder is removed. Those of skill in the art will appreciate that different polymer binders can require different debinding temperatures, multiple debinding temperature stages, and times.

Figure 3:
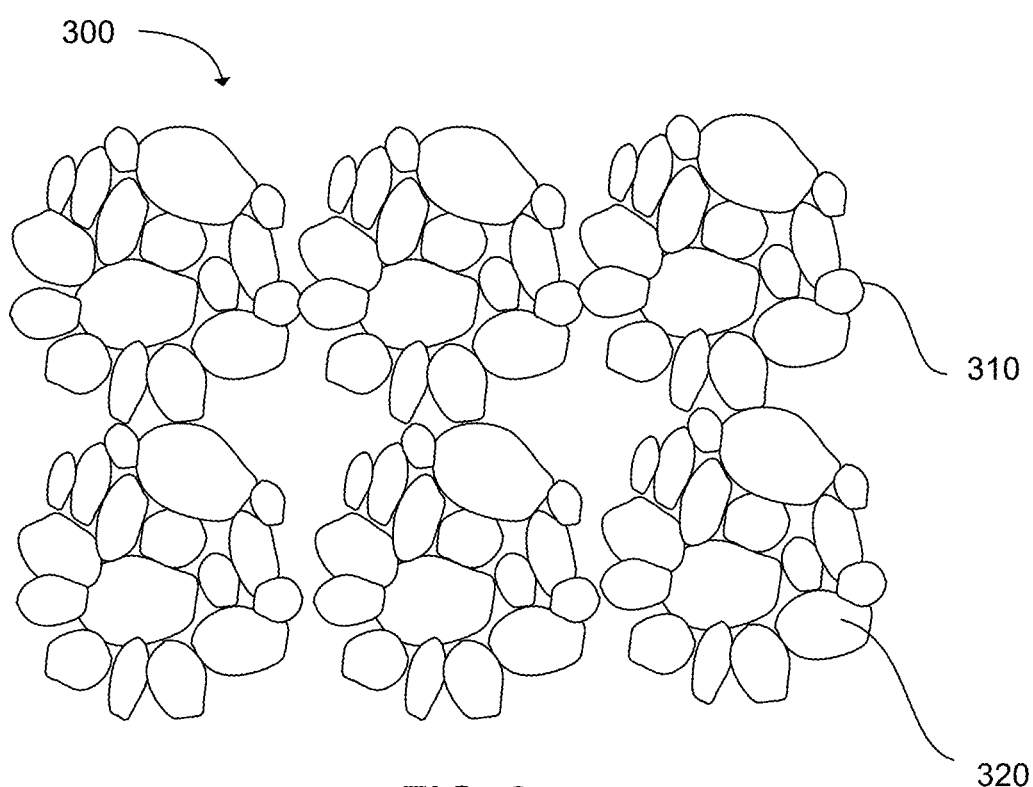
FIG. 3 shows a debinded mass, comprising debinded granules with a reduced binder content.

FIG. 3 shows a debinded mass 300, comprising debinded granules 310 comprising source metal particles 320 with a reduced binder content, which is in some cases also eliminated entirely. The debinded granules retain a roughly spherical shape, with void spaces between the debinded granules. The debinded mass can typically be fragile and exhibits low mechanical strength until at least partial sintering occurs.

The debinded granules can be partially or fully sintered at a sintering temperature such that particles within each granule fuse together to form sintered granules. Debinding and sintering can be done in the same furnace as two separate steps. Especially for Ti, debinding in a separate furnace as that for sintering may cause oxygen content to increase during the transfer from the debinding furnace to the sintering furnace. Thus, performing both debinding and sintering in the same furnace can allow for avoidance of contact with air which can cause oxidation or contact with oxygen. However, debinding and sintering can also be done in two separate furnaces as two separate steps. Debinding and sintering in two separate furnaces has practical advantages of not tying up a high temperature sintering furnace for too long. An increase in oxygen in the material can be dealt with in a subsequent de-oxygen process. Sintering can be conducted in a controlled inert gas atmosphere that may be vacuum, argon, hydrogen, nitrogen (for TiN powder), or mixtures thereof. One method of sintering that can be used is described in U.S. Patent Appl. No. 61/479,177. Sintering conditions can be chosen to facilitate sintering of metal powders within each granule while minimizing inter-granule bonding. The partial sintering can be performed at a sintering temperature from about 700° C. to about 1400° C., and in some cases 900° C. to about 1000° C. Suitable sintering temperatures are similar for CP—Ti and Ti-6Al-4V alloy. The partial sintering can also be performed for a sintering time from about 1 second to about 100 hours, and often less than 24 hours. In some embodiments, the sintering time can be from about 30 minutes to about 1 hour. Pressure conditions are generally atmospheric or held under pressure. In other embodiments, sintering can proceed until the sintered granules reach a predetermined level of densification. In one specific embodiment, the partial sintering is performed until the partially sintered granules reaches from about 60% to about 80% densification, and often at least 65%.

In a further embodiment, the partial sintering can proceed until the debinded granules are fully sintered while retaining frangibility and/or separability. For example, sintered granules can fuse together at contact points between the granules but the granules retain unfused surface area sufficient to allow individual granules to be recovered. Typically, an unfused surface area of at least about 30% will allow the sintered frangible body to be crushed and individual granules recovered. In some cases, unfused granule surface area can be substantially 100% such that the sintered granules are not connected and are a loose collection of independent granules. Accordingly, sintering of the debinded granules can also be performed until each sintered granule is substantially free from bonding to each other.

Figure 4:
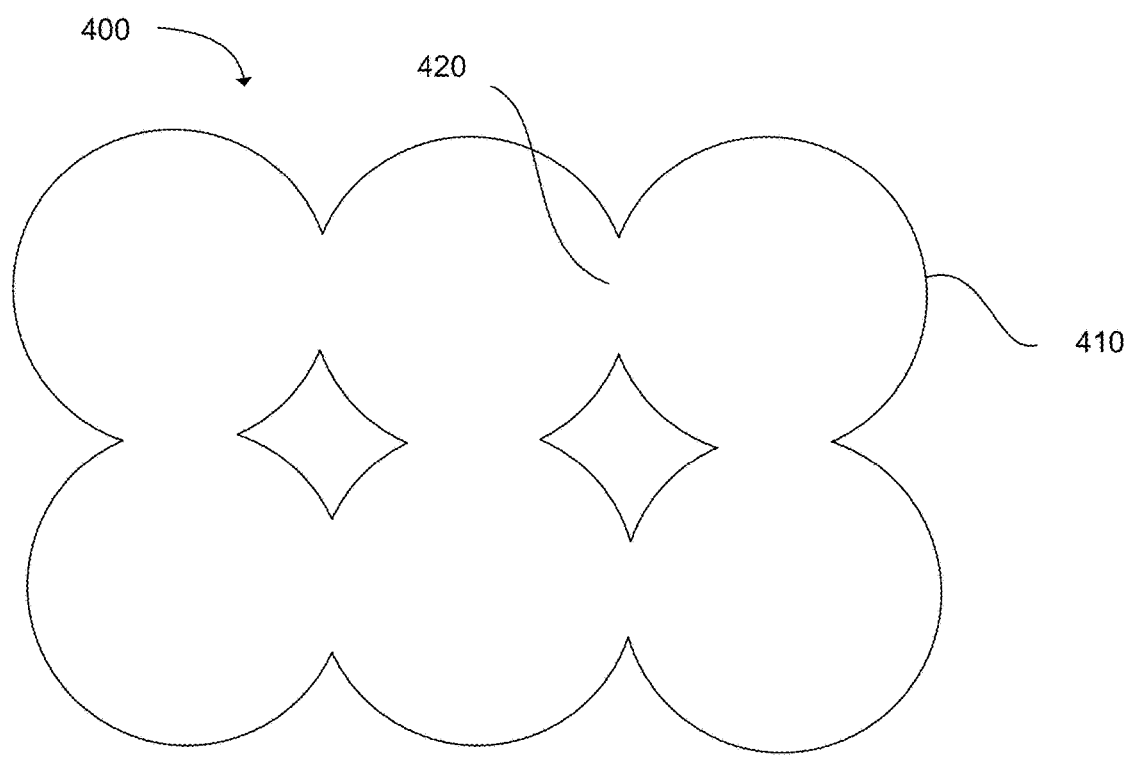
FIG. 4 illustrates a partially sintered frangible body of substantially spherical metal granules in accordance with a further embodiment of the present invention.

FIG. 4 shows a partially sintered frangible body 400 of substantially spherical metal granules 410 in accordance with a further embodiment of the present invention. As shown in the figure, the source metal particles have fused together so that the granules are substantially sintered spherical metal particles, as opposed to the agglomerates of separate source metal particles that were present before the sintering step. The sintered metal granules are bonded together at contact points 420, but a sufficient amount of unfused surface area is retained so that the agglomerates can be broken apart to form substantially spherical particles. Thus, substantially spherical allows for some flat or irregular surfaces along interface contact points upon crushing the frangible body.

After sintering, if the granules are bond to each other, the frangible body can be subjected to ball milling or other crushing techniques to break up the contacts between sintered granule particles. Other methods can also be used to break the frangible body. This forms the substantially spherical metal powder. The substantially spherical powder can include spherical or nearly-spherical particles. Spherical or near-spherical includes particles which are suitable for 3D printing and which have dimensions which are low aspect ratio and avoid jagged or irregular shapes. In some embodiments, the substantially spherical metal powder can have an average particle aspect ratio less than about 1.5. In further embodiments, the average particle aspect ratio can be less than about 1.1. As used herein, "aspect ratio" refers to the longest dimension of a particle divided by the shortest dimension of the particle.

The substantially spherical metal powder can have an average final particle size from about 10 to about 500 micrometers. In certain embodiments, the average final particle size can be from about 10 to about 40 micrometers, and in further embodiments the average final particle size can be from about 10 to about 30 micrometers, and in further embodiments the average final particle size can be from about 30 to about 80 micrometers And in further embodiments the average final particle size can be from about 70 to 300 micrometers. For additive manufacturing, typical particle sizes range from 10 to 100 micrometers. For powder injection molding, typical particle sizes range from 10 to 45 micrometers. For using the powder as raw materials for hot isostatic pressing, the typical particle size range is from 70 to 300 micrometers. For spray coating applications, the typical particle size ranges from 10 to 30 micrometers. Similarly, in porous titanium applications, typical particle sizes range from 100 to 500 micrometers. The substantially spherical metal powder can also have a particle size distribution. The final powder can be sieved to different size cuts. The granules can also be sieved into different size cuts before debinding such that the spherical metal powder can have a narrow particle size distribution. For example, in one embodiment more than 80% of particles in the substantially spherical metal powder have a particle size within 20% of the average final particle size.

The substantially spherical metal powder can be a variety of metals, depending on the source metal used. In some embodiments, the substantially spherical metal powder can be titanium, zirconium, hafnium, thorium, vanadium, niobium, tantalum, chromium, molybdenum, tungsten, nickel, even aluminum and iron, alloys of these, and alloys of the above with one or other metals or non-metals, or combinations thereof, such as Ti and Ti alloys like CP—Ti and Ti-6Al-4V, nickel based high temperature alloys, stainless steels, Nb and Nb based alloys. Compared to current commercially available CP—Ti powder, the powder according to the present invention can have a more consistent spherical shape and a narrower particle size distribution, making the powder more suitable for 3D printing or injection molding applications. With respect to Ti-6Al-4V powder, the present powder can match or nearly match the qualities of PREP Ti-6Al-4V powder at a much lower cost.

Depending on the oxygen content of the sintered granules, a de-oxygen step can be performed to reduce oxygen content to acceptable levels. Very often, the oxygen content of the titanium powder and products can be less than 0.2%. Because the oxygen content may increase during the processes of making Ti alloy products from Ti powders, the oxygen content of Ti or Ti alloy powders can be significantly less than 0.2% in order to accommodate some oxygen uptake. In some cases, the oxygen content of Ti powders can be less than 0.15%. For example, to meet the specifications of some commercial alloys that require extra low content of interstitial elements, i.e. the so-called ELI grade of Ti-6Al-4V alloy, the oxygen content of Ti powders must be less than 0.13%. Therefore, in some cases the spherical powders produced using the present technology can have a low oxygen content, such as less than 0.3% by weight.

De-oxygen techniques can be applied to sintered powders, or a de-oxygenation process can be combined with the granule-sintering process. The de-oxygen step can be applied to powders with oxygen content higher than 0.2% and lower than 40% by weight (which is the approximate 0% of $TiO_2$); or, in further examples, powders with oxygen content between 0.2 and 14.3% by weight. The de-oxygen process can readily reduce the oxygen content of the powder down to approximately 0.1%.

Although other de-oxygen techniques may be used, one exemplary technique for dexoygenation can be accomplished by using a calciothermic method. Specifically, calcium (Ca) or calcium hydride ($CaH_2$) is mixed with the powder to be deoxygenated according to a specific ratio depending on the amount of oxygen to be removed. For example, one or both of Ca or $CaH_2$ may be mixed with the powder. The ratio between Ca and the powder to be de-oxygenated depends on the oxygen content of the powder. The molar ratio between Ca and the oxygen in the powder may generally range from 1:1 to 5:1). The mixture can be further blended with a salt, such as calcium halide salt, calcium halide-alkali halide eutectic salt, calcium halide-calcium halide eutectic salt or combination of these, which will act as a flux or media that facilitate the reactions between Ca and oxygen. In one example, a eutectic salt mixture can be used which has a melting point below that of Ca or $CaH_2$. This can allow the de-oxygen process to be carried out at temperatures below the melting point of Ca or $CaH_2$. The eutectic salt selected has low melting point, which allows and facilitate the reaction at lower temperatures. Calcium halide bearing salt can generally be a part of the eutectic salt. In one example, the melting point of CaCl is approximately 780° C., while the eutectic point of CaCl-15% KCl is approximately 700° C. Non-limiting examples of suitable Ca halides and eutectic salts are given as follows.

a) Calcium halides salt, including $CaCl_2$, $CaBr_2$, $CaI_2$;
b) Calcium halide-alkali halide eutectic salt, including $CaCl_2$—LiCl, $CaCl_2$—KCl, $CaCl_2$—$MgF_2$, $CaCl_2$—LiF, $CaCl_2$—KF, $CaCl_2$—NaF, $CaCl_2$—NaBr, $CaCl_2$—LiBr, $CaCl_2$—KBr, $CaCl_2$—NaI, $CaCl_2$—LiI, $CaCl_2$—KI, $CaBr2.LiCl$, $CaBr_2$—KCl, $CaBr_2$—$MgF_2$, $CaBr_2$—LiF, $CaBr_2$—KF, $CaBr_2$—NaF, $CaBr_2$—NaBr, $CaBr_2$—LiBr, $CaBr_2$—KBr, $CaBr_2$—NaI, $CaBr_2$—LiI, $CaBr_2$—KI, $CaI_2$—LiCl, $CaI_2$—KCl, $CaI_e$—$MgF_2$, $CaI_e$—LiF, $CaI_2$—KF, $CaI_2$—NaBr, $CaI_2$—LiBr, $CaI_2$—KBr, $CaI_2$—NaI, $CaI_2$—LiI, $CaI_2$—KI;
c) Calcium halide-calcium halide eutectic salt, including $CaCl_2$—$CaBr_2$, $CaCl_2$—$CaI_2$, $CaCl_2$—$CaF_2$, $CaBr_2$—$CaI_2$, $CaBr_2$—$CaF_2$, $CaI_2$—$CaF_2$;
d) Eutectic salt formed from three or more salts mentioned in a), b) or c), which at least containing one calcium salt.

The entire mixture of the salt and the powder is then loaded in a boat, placed in a reactor chamber, heated to a high temperature between 400 and 1200° C., most often between 500 and 900° C., held for a period of time from 1 minute to 120 hours, in an inert or reducing atmosphere, and finally furnace cooled to room temperature. The resulting mixture after the above de-oxygen processing contains CaO, which can be leached in an aqueous solution containing acid such as HCl, although other leaching agents can be suitable. The final deoxygenated product can be spherical Ti or Ti alloy powder with oxygen content less than 0.3%, and more often less than 0.2%.

Figure 5:
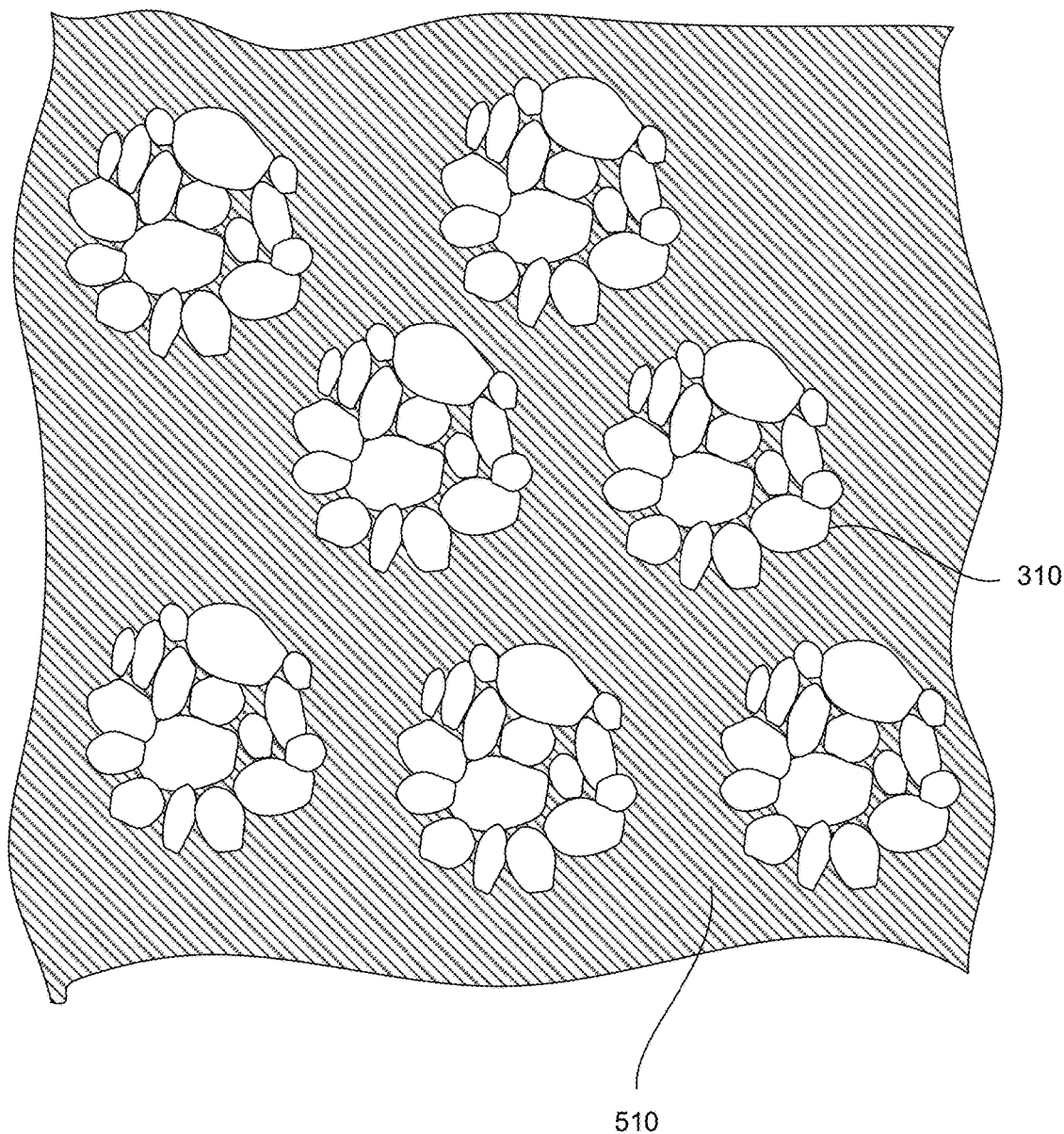
FIG. 5 illustrates debinded granules in a mixture of a de-oxygen agent and a salt in accordance with another embodiment of the present invention.

FIG. 5 shows debinded granules 310 in a Ca-salt mixture 510. As shown in the figure, the Ca-salt mixture can occupy spaces between the granules so that the granules remain separate during the sintering process. The granules are sintered to become spherical titanium powder particles. The Ca-salt mixture removes oxygen from the granules, forming CaO. After sintering, the CaO and other materials can be removed by leaching to leave a loose, spherical titanium powder. Unlike the above examples involving breaking apart a frangible body of partially sintered titanium spheres, in the present example the spherical titanium powder is ready to use without additional processing.

Although the above example shows the de-oxygen agent combined with debinding granules, the granules do not necessarily need to be debinded before mixing the granules with the de-oxygen agent. In some cases, the de-oxygen agent can be mixed with granules before debinding. The steps of debinding, deoxygenating, and sintering can all be performed together. In such an example, the de-oxygen agent can act as a pressure transmitting media to further compact the granules during sintering, and the de-oxygen agent can separate the granules from each other during sintering so that the granules do not bond to each other during sintering. In other cases, the granules can be debinded and sintered before using the de-oxygen agent to remove oxygen from the sintered granules The de-oxygen step can be applied to Ti powders regardless of the source material ($TiH_2$, or Ti scrap, or $TiO_2$, or processed TiO2 rich mineral, or other forms of Ti) that was used, any other metal regardless of the source material (metal hydride, scrap, oxide) or the morphology of the powder (spherical, irregular, granular, or others). In other words, the de-oxygen step can be incorporated in all embodiments of this invention as a separate step or as an integral part of the process.

Accordingly, the spherical metal granules formed by this process can exhibit unique characteristics which are distinct from those exhibited by plasma formation and many other processes. Thus, in one aspect, a collection of substantially spherical metal granules can be formed by the inventive method. The metal granules can be fully sintered (i.e. greater than 99% relative density) or they can be porous having a relative density from 1% to 35%, and in some cases 5% to 30%. Partially sintered granules can be achieved by using lower temperatures and/or shorter sintering times than needed to achieve a fully sintered granule product. For example, for titanium materials, a sintering temperature from about 700° C. to about 900° C. can result in partial sintering. Plasma processed powder is fully dense apart from occasional solidification voids. Plasma processed powder has a microstructure that is characteristic of a solidified microstructure, while a microstructure of the granules of this process have no such characteristics of solidification. Characteristics of solidification can include dendritic structure, columnar structure, or ultrafine microstructure that would result from rapid solidification. Thus, the spherical granules formed by this invention have microstructure characteristics of a sintered microstructure that is relatively coarse, near equilibrium phase compositions, and often substantially fewer satellite particles. For example, the microstructure of sintered Ti-6Al-4V would be laminar with alpha and beta phases. The microstructure of sintered Ti alloys will also not have dendrites. The surface morphology of sintered granules would also be rougher than that of plasma processed powder.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

Figure 6:
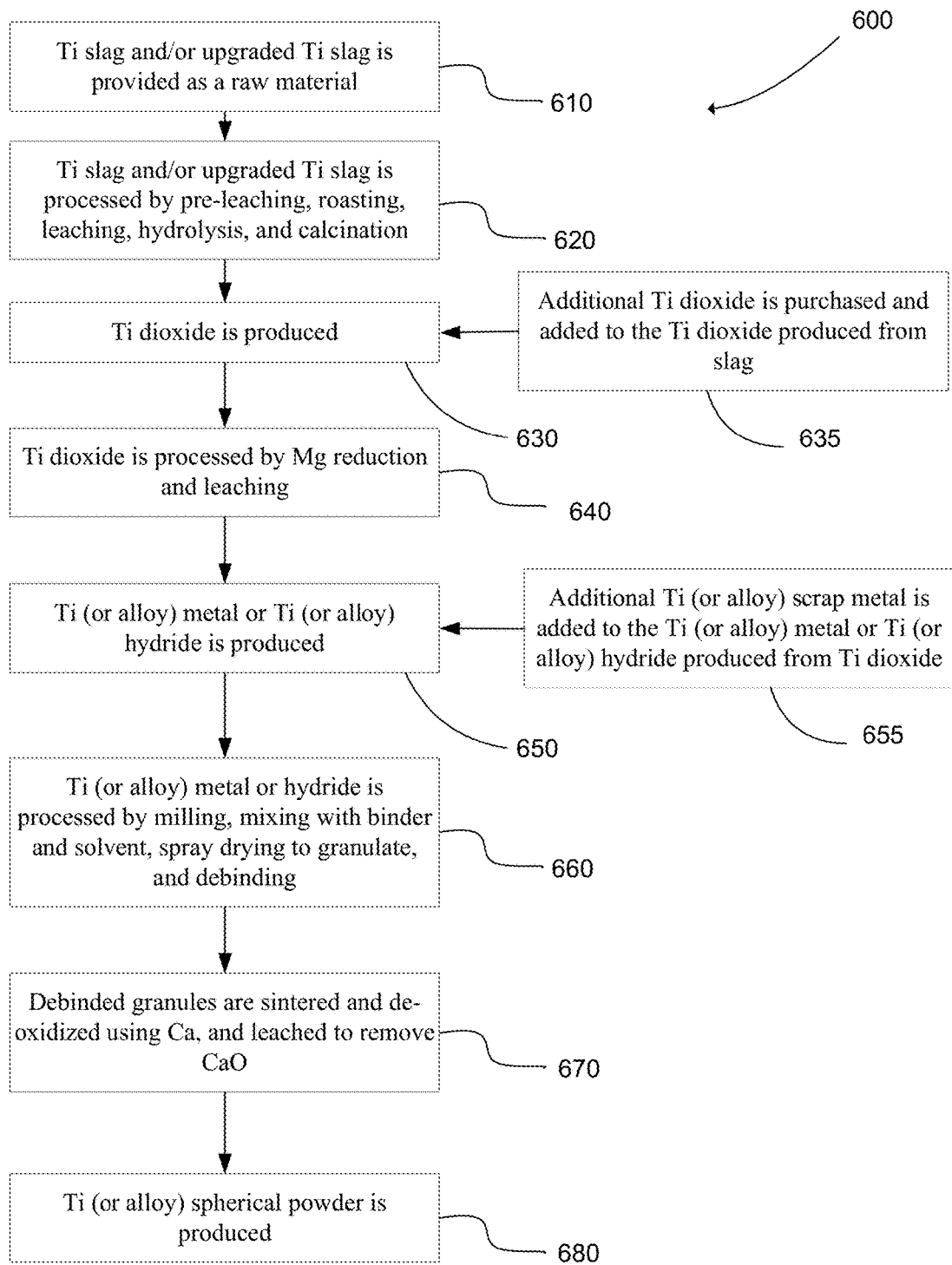
FIG. 6 is a flow chart outlining an additional method for producing a substantially spherical metal powder in accordance with an embodiment of the present invention.

To summarize the embodiments and methods described above, FIG. 6 shows a flowchart of a method 600 including several of the steps described above for producing a substantially spherical titanium or titanium alloy powder. First, Ti slag and/or upgraded Ti slag is provided as a raw material 610. The Ti slag and/or upgraded Ti slag is processed by pre-leaching, roasting, leaching, hydrolysis, and calcination 620. This produces Ti dioxide 630. At this point, additional Ti dioxide can be purchase or otherwise obtained and added to the Ti dioxide produced from the slag 635. The Ti dioxide is then processed by Mg reduction and leaching 640. This forms Ti metal, Ti hydride, or a Ti alloy or hydride of a Ti alloy 650. At this point, addition Ti metal, hydride, or Ti alloy or hydride of Ti alloy can be added. These materials can be obtained as scrap metal 655. The Ti (or alloy) metal or hydride is then processed by milling, mixing with binder and solvent, spray drying to granulate, and debinding to remove the binder 660. The debinded granules are sintered and deoxidized using Ca, and leached to remove CaO 670. The final product of the process is Ti (or alloy) spherical powder 680.

Example 1: Preparation of $TiH_2$ from UGS

An example of the preparation of $TiO_2$ powder and the reduction of $TiO_2$ using Mg to produce $TiH_2$ is given as follows. As-received UGS with an average size of larger than 200 micrometers is ball milled to expose the wrapped Si and benefit for re-leaching. The size of the milled UGS can readily reach several micrometers, for example, 1 to 5 micrometers. Next, 100 grams of milled UGS is pre-leached by an alkaline solution with 200 g/L NaOH at 100° C. for 2 hours, with the volume-to-mass ratio controlled at 2:1. After the pre-leaching, the slurry is subjected to solid/liquid separation, and the residual solids of around 100 grams are dried and prepared for roasting processing. Then, 100 grams of the pre-leached residue are mixed with 150 grams of commercial NaOH solid by a tumbler for 30 minutes, and the mixture is charged into an Inconel reactor. The reactor is placed into a top-loaded box furnace. The furnace is heated and a thermocouple is used to track the temperature profile of the mixture. After maintaining at 500° C. for an hour, the reactor is cooled and removed from the furnace, and the roasted product is crushed into powder. 250 grams of the roasted powder is washed with 500 mL water at 50° C. for 30 minutes under stirring, followed by solid/liquid separation. The washing procedure is repeated several times until the pH value of the solution reaches to around 12. A mud-like material with a main component of titanic acid is obtained. This material is subjected to leaching in a dilute HCl solution with a concentration of around 6 mol/L. Titanium and other alkali-indissoluble transition metal species such as Fe are dissolved simultaneously. The leachate is filtered to remove other indissoluble particles ahead of the hydrolysis. The $TiCl_4$-bearing solution is transferred into a sealed crystallizer, and the ferric ion existing in the solution is reduced by $Ti^{3+}$ ion to ferrous ion. The crystallizer is placed in an oil bath with temperature set at 100° C. A reflux condenser is configured with the crystallizer to avoid water and HCl evaporation during the hydrolysis. Then the precipitation is maintained at 100° C. for 15 hours under continuous stirring. The obtained precipitate is washed by water at 60° C. until the liquid reaches neutral pH. The precipitate is pyrotannic acid with a particle size between 9 and 30 micrometers. The precipitate is further calcinated at 600° C. for 2 hours to remove water and generate anatase, and then at 900° C. for 2 hours to generate rutile.

The rutile prepared from UGS is then reduced by Mg. 90 grams of rutile, 81 grams of Mg metal, 60 grams of anhydrous $MgCl_2$ and 30 grams of KCl are sufficiently mixed by a tumbler. The mixture is charged into a stainless steel reactor lined with Mo foil. The reactor is placed into a top-loaded box furnace which is sealed by screws. The chamber of the furnace is vacuumed and purged with Ar gas 4 times, and then refilled with $H_2$ gas flowing through the chamber at a flow rate of 1 L/min. The furnace is heated, and the reduction is accomplished at 750° C. for 6 hours. After reduction, the reduced powder is composed of $MgCl_2$—KCl eutectic salt, MgO and $TiH_2$. This powder is leached by acetic acid, rinsed by water, and dried in a desiccator at room temperature. $TiH_2$ intermediate with an oxygen content of around 1.34% is obtained, which can be used as the source material to make granules by spry drying.

Example 2: Preparation of Spray Dried $TiH_2$ Granules

Figure 7:
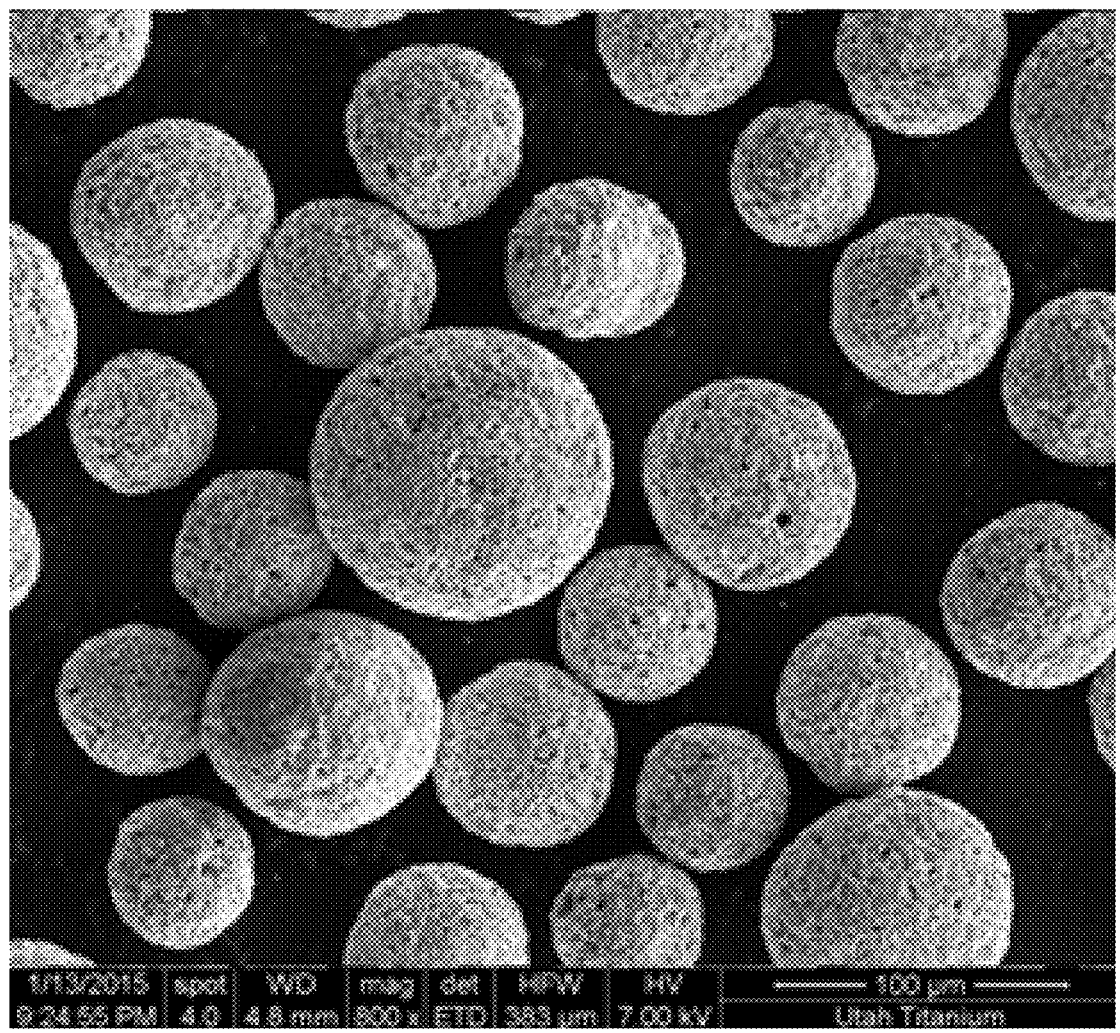
FIG. 7 is a SEM photo of spray dried spherical $TiH_2$ granules in accordance with an embodiment of the present invention.

Granules were prepared by mixing fine $TiH_2$ particles with a binder and solvent and spray drying the mixture to form spherical granules. FIG. 7 is a SEM photo of the spherical $TiH_2$ granules. The granules range in size from about 40 micrometers to about 100 micrometers.

Example 3: Preparation of Partially Sintered Granules

Figure 8:
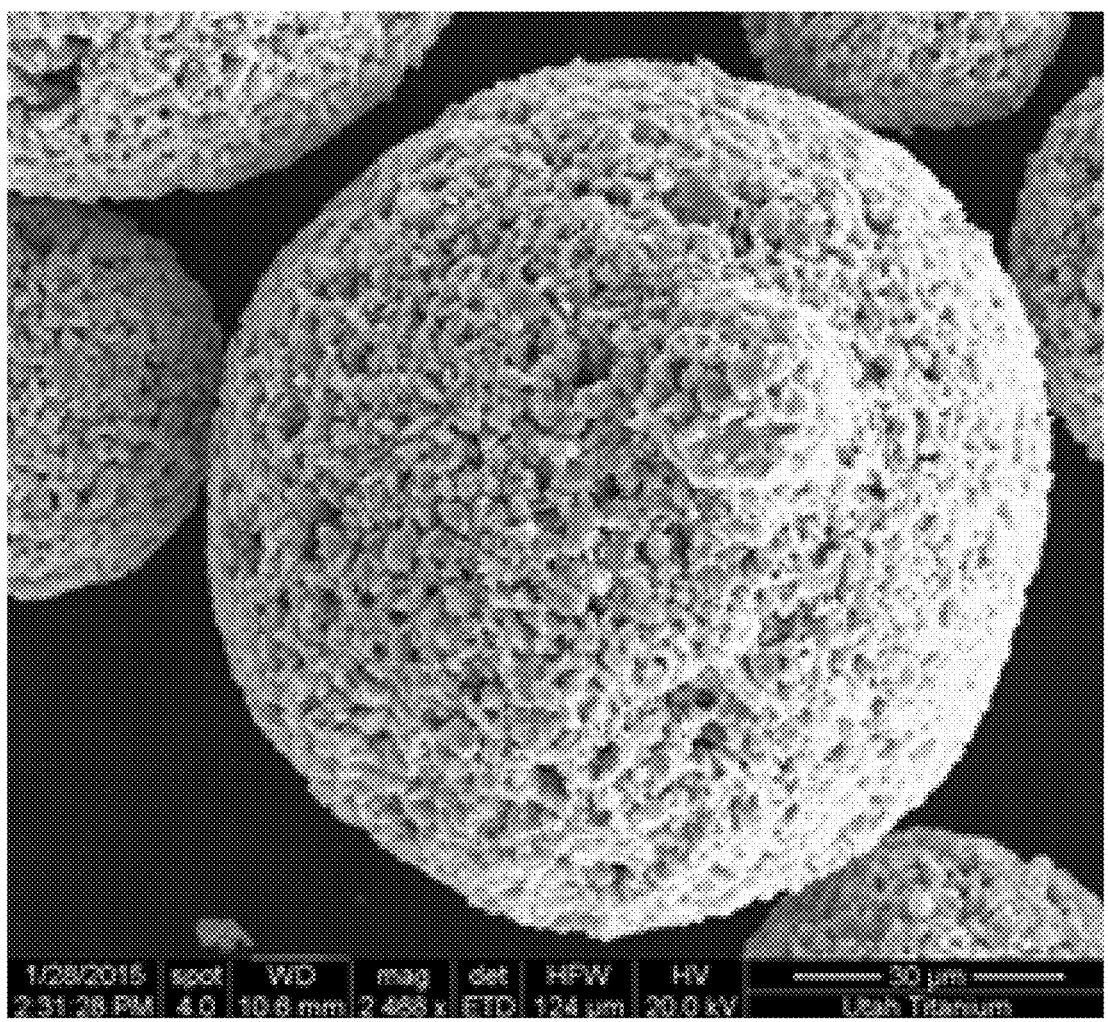
FIG. 8 is a SEM photo of a partially sintered $TiH_2$ granule in accordance with an embodiment of the present invention.

Granules were prepared by mixing fine $TiH_2$ particles with a binder and solvent and spray drying the mixture to form spherical granules. The granules were debinded at a temperature range of 250-400° C. for 9 hours in flowing argon in a tube furnace. After the debinding stage, the temperature was increased to 70° C. and held for 30 minutes for dehydrogenation and partial sintering in the same tube furnace. FIG. 8 is a SEM photo of a partially sintered granule.

Example 4: Preparation of Ti-6Al-4V Spherical Powder

Figure 9:
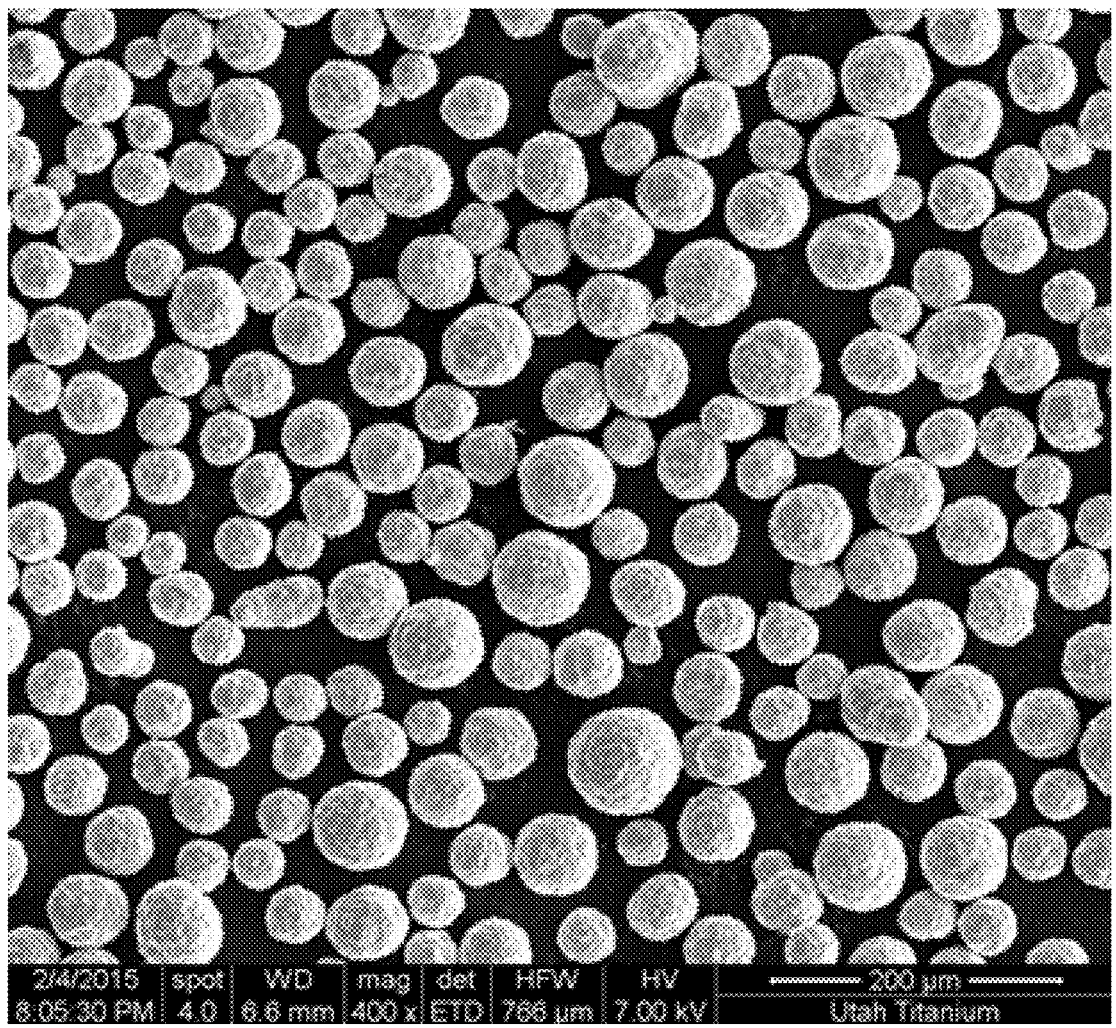
FIG. 9 is a SEM photo of sintered Ti-6Al-4V granules in accordance with an embodiment of the present invention.

An example of spray drying, debinding, and sintering of spherical granules is given as follows. The source metal used in this example is 2000 grams of −325 mesh Ti-6Al-4V hydride made from Ti-6Al-4V alloy scrap. Slurry for spray drying was prepared by ball-milling the powder in a solution of 500 ml water, 1500 ml ethyl alcohol and 30 g polyvinyl alcohol in an attritor (Union Process lab attritor HD-1) with a rotational speed of 300 rpm. After milling, the particle size of the hydride powder was reduced to less than 10 micrometers. Granulation was conducted in Buchi Mini Spray Dryer B-290 with an inlet temperature of 210° C. to form Ti-6Al-4V hydride granules. The slurry was stirred by a magnetic stirrer during being fed to the spray dryer. The dried granules were mixed with CaO with a mass ratio of 1:1, and then the mixture was pressed in a cold isostatic press (CIP) with a pressure of 50 MPa. The CIPed part was debinded in the temperature range of 250-400° C. for 9 hours and sintered at 1300° C. for 1 minute in flowing argon in the same tube furnace. CaO was leached out using dilute chloride acid and water after debinding and sintering. Spherical Ti-6Al-4V particles were collected after drying. The morphology of as-sintered Ti-6Al-4V granules is shown in FIG. 9, which is a SEM photo of the sintered granules.

It is to be understood that the sintering process described above is only one example. A variety of other sintering processes can be used including continuous atmospheric sintering, pressure assisted sintering, plasma sintering, microwave sintering, and flash sintering techniques. In particular flash sintering techniques using vertical furnaces can be useful for making spherical powder according to the present invention.

Example 5: De-Oxygen Process

Ti sintered spherical powder with 3.91 wt. % oxygen was deoxygenated in $CaCl_2$—KCl eutectic salt. Ti sintered spherical powder with the size of 20-45 micrometers, weighing 10 grams, was mixed with 2 grams of 6 mesh granular calcium, 8.5 grams of anhydrous $CaCl_2$ powder, and 1.5 gram of anhydrous KCl powder and put into a Mo crucible. The crucible containing the mixture was then placed in a tube furnace. The furnace tube was evaluated and flushed with regular laboratory pure argon three times prior to heating. The furnace was then heated to 800° C. with the heating rate of 10° C./min and held for 12 hours in a flowing Ar atmosphere. The furnace was then cooled down to room temperature and opened. The treated product was then taken out from the crucible and leached with 200 ml dilute HCl for 2 hours. The pH value of the solution was controlled between 2 and 5. The leached product was then washed with water for 3 times and rinsed with ethanol and finally dried in vacuum for 12 h. The oxygen content of the Ti spherical powder was decreased from an initial value of 3.91 wt. % to a final concentration of 0.0740 wt. %, a reduction of 98.1%.

Example 6: De-Oxygen Process

Deoxygenation of niobium (Nb)-30 wt. % hafnium (Hf) (C103 alloy) powder with 0.22 wt. % oxygen with $CaCl_2$—LiCl eutectic salt as the molten salt. Nb-30 wt. % Hf powder with the size of <37 micrometers, weighing 10 grams, 0.5 grams of 6 mesh granular calcium, 7 grams of $CaCl_2$ powder, and 3 grams of LiCl powder were mixed and put into a stainless steel crucible. The crucible containing the mixture was placed in a tube furnace. The furnace tube was evaluated and flushed with regular argon three times prior to heating. The furnace was then heated to 700° C. with a heating rate of 10° C./min and held for 1 hour in a flowing Ar atmosphere. The furnace was then cooled down to room temperature and opened. The treated product was then taken out from the crucible and leached with 200 ml dilute $HNO_3$ for 2 hours. The pH value of the acid was controlled between 2 and 5. The leached product was then washed with water 3 times and rinsed with ethanol and finally dried in vacuum. The oxygen content of the Nb-30 wt. % Hf powder was decreased from an initial value of 0.22 wt. % to a final concentration of 0.055 wt. %, a reduction of 75%.

What is claimed is:

1. A method for producing a substantially spherical metal or metal alloy powder comprising:
providing a particulate source metal including a primary particulate and having an average starting particle size, wherein the particulate source metal consists essentially of one or more of a metal, a metal alloy, a hydride thereof, or an oxide thereof;

mixing the particulate source metal with a binder and an optional solvent to form a slurry;

granulating the slurry to form substantially spherical granules, wherein each granule comprises an agglomeration of particulate source metal;

debinding the granules at a debinding temperature to reduce a binder content of the granules forming debinded granules;

at least partially sintering the debinded granules at a sintering temperature such that particles within each granule fuse together to form partially or fully sintered granules;

recovering the sintered granules to form the substantially spherical metal or metal alloy powder.

2. The method of claim 1, wherein the substantially spherical metal powder has an average final particle size from about 1 to about 1000 micrometers.

3. The method of claim 1, wherein the substantially spherical metal powder is selected from the group consisting of titanium, zirconium, hafnium, thorium, vanadium, niobium, tantalum, chromium, molybdenum, tungsten, nickel, aluminum, iron, alloys of the above metals with each other, alloys of the above metals with other metals, alloys of the above metals with non-metals, CP—Ti alloy, Ti-6Al-4V alloy, nickel-based high temperature alloys, stainless steel, and combinations thereof.

4. The method of claim 1, wherein the substantially spherical metal powder comprises the metal or metal alloy selected from the group consisting of nickel based super alloy, cobalt-chromium alloy, aluminum alloys, stainless steel alloys, tantalum alloys, tungsten alloys, molybdenum alloys, and combinations thereof.

5. The method of claim 1, wherein the substantially spherical metal powder has an average particle aspect ratio less than about 1.5.

6. The method of claim 1, wherein the particulate source metal comprises titanium, titanium hydride, Al—V master alloy, titanium oxide, or mixtures thereof.

7. The method of claim 1, wherein the particulate source metal comprises zirconium, hafnium, thorium, vanadium, niobium, tantalum, chromium, molybdenum, tungsten, nickel, aluminum, iron, alloys of the above metals with each other, alloys of the above metals with metals, alloys of the above metals with non-metals, CP—Ti alloy, Ti-6Al-4V alloy, nickel-based high temperature alloys, stainless steel, hydrides thereof, oxides thereof, or combinations thereof.

8. The method of claim 1, wherein the particulate source metal consists essentially of one or more of a metal or a metal alloy.

9. The method of claim 1, further comprising making the particulate source metal from a raw material selected from titanium slag, upgraded titanium slag, titanium dioxide, scrap titanium, scrap titanium alloy, or a combination thereof.

10. The method of claim 1, wherein the average starting particle size of the primary particulate is from 0.1 to 100 micrometers.

11. The method of claim 1, wherein mixing the particulate source metal with a binder further comprises wet ball milling the particulate source metal and the binder in the solvent.

12. The method of claim 1, wherein granulating the slurry comprises spray drying, rotary drying, vibratory pelletizing, freeze granulation and drying, or combinations thereof.

13. The method of claim 1, wherein the granules have an average granule size from about 20% to about 50% larger than an average final particle size of the substantially spherical metal powder.

14. The method of claim 1, wherein the granules have an average granule size greater than 10 micrometers.

15. The method of claim 1, wherein the debinded granules are mixed with CaO powder such that granules are separated by CaO powder during sintering.

16. The method of claim 1, wherein sintering the debinded granules is performed until each sintered granule reaches a relative density greater than 65%.

17. The method of claim 1, wherein sintering the debinded granules is performed such that each sintered granule is substantially free from bonding to each other.

18. The method of claim 1, wherein sintering the debinded granules is performed until the debinded granules fuse together at contact points between the debinded granules but the debinded granules retain at least about 20% unfused surface area on average.

19. The method of claim 1, wherein the at least partially sintering is performed such that the granules are connected to each other forming a frangible body of at least partially sintered granules; and wherein the at least partially sintered granules are separated by breaking the frangible body to recover the substantially spherical metal powder.

20. The method of claim 19, wherein breaking the frangible body comprises ball milling the frangible body.

* * * * *

UNITED STATES PATENT AND TRADEMARK OFFICE
CERTIFICATE OF CORRECTION

PATENT NO. : 10,130,994 B2
APPLICATION NO. : 15/234973
DATED : November 20, 2018
INVENTOR(S) : Zhigang Z Fang et al.

Page 1 of 1

It is certified that error appears in the above-identified patent and that said Letters Patent is hereby corrected as shown below:

In the Specification

Column 1 Line 16: Insert new paragraph with heading:
--GOVERNMENT LICENSE RIGHTS
This invention was made with government support under grant DE-0000420 awarded by the Department of Energy. The government has certain rights in this invention.--

Signed and Sealed this
Tenth Day of March, 2020

Andrei Iancu
*Director of the United States Patent and Trademark Office*